United States Patent
Kaster

(10) Patent No.: US 11,956,369 B2
(45) Date of Patent: Apr. 9, 2024

(54) ACCELERATED VERIFICATION OF AUTOMOTIVE SOFTWARE IN VEHICLES

(71) Applicant: Robert Bosch GmbH, Stuttgart (DE)

(72) Inventor: Robert M. Kaster, White Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 364 days.

(21) Appl. No.: 17/388,940

(22) Filed: Jul. 29, 2021

(65) Prior Publication Data

US 2022/0052854 A1    Feb. 17, 2022

Related U.S. Application Data

(60) Provisional application No. 63/065,419, filed on Aug. 13, 2020.

(51) Int. Cl.
*H04L 9/32* (2006.01)
*G06F 21/00* (2013.01)
(Continued)

(52) U.S. Cl.
CPC .......... *H04L 9/3242* (2013.01); *G06F 21/577* (2013.01); *G06F 21/604* (2013.01); *H04L 9/0894* (2013.01); *H04L 9/3247* (2013.01)

(58) Field of Classification Search
CPC ...... G06F 21/577; G06F 21/604; G06F 21/44; G06F 21/45; G06F 21/50; G06F 21/51; G06F 21/57; G06F 21/575
See application file for complete search history.

(56) References Cited

U.S. PATENT DOCUMENTS 8,881,308 B2    11/2014    Baltes et al.
9,792,440 B1    10/2017    Wang
(Continued)

FOREIGN PATENT DOCUMENTS

WO    2020164921 A1    8/2020

OTHER PUBLICATIONS

G. Ateniese, R. Di Pietro, L. V. Mancini and G. Tsudik, "Scalable and Efficient Provable Data Possession," in SecureComm, Istanbul, Turkey, (Sep. 2008).
(Continued)

*Primary Examiner* — Edward Zee
(74) *Attorney, Agent, or Firm* — Michael Best & Friedrich LLP

(57) ABSTRACT

Systems, methods, and vehicles for verifying integrity of automotive software. In one implementation, an electronic processor is configured to receive a power-up signal and randomly select one of a plurality of fingerprints. The electronic processor is also configured to retrieve a set of data stored in the memory cells of the selected fingerprint. The electronic processor is further configured to calculate a pre-boot verification value for the selected fingerprint using a one-way cryptographic function with a secret key and the retrieved set of data. The electronic processor is also configured to compare the pre-boot verification value to a reference verification value for the selected fingerprint. The electronic processor is further configured to release a security halt on the software image when the pre-boot verification value matches the reference verification value for the selected fingerprint.

21 Claims, 8 Drawing Sheets

(51) Int. Cl.
  *G06F 21/57*  (2013.01)
  *G06F 21/60*  (2013.01)
  *H04L 9/08*  (2006.01)

(56) References Cited

U.S. PATENT DOCUMENTS

| | | |
|---|---|---|
| 10,482,255 B2 | 11/2019 | Maletsky |
| 10,484,184 B2 | 11/2019 | Oguma et al. |
| 2018/0183605 A1 | 6/2018 | Kawabata et al. |
| 2019/0028448 A1 | 1/2019 | Farrell |
| 2020/0285749 A1* | 9/2020 | Goto ........................ G06F 21/51 |

OTHER PUBLICATIONS

A. M. Nasser, W. Gumiseand D. Ma, "Accelerated Secure Boot for Real-Time Embedded Safety Systems," SAE Int. J. Transp. Cybersecurity Priv, vols. 2, No. 1, No. July, p. 11, 2019.

* cited by examiner

ACCELERATED VERIFICATION OF AUTOMOTIVE SOFTWARE IN VEHICLES

RELATED APPLICATION

The present application is related to and claims benefit under 35 U.S.C § 119(e) from U.S. Provisional Patent Application No. 63/065,419, filed Aug. 13, 2020 titled "ACCELERATED VERIFICATION OF AUTOMOTIVE SOFTWARE IN VEHICLES," the entire contents of which being incorporated herein by reference.

FIELD

The present disclosure relates generally to automotive software verification. More specifically, the present disclosure relates to accelerated verification of automotive software in electronic control units of vehicles.

BACKGROUND

As automotive controllers expand both their connections to the outside world and their authority over the behavior of the vehicle, proven practices from internet technology security are being adopted to protect automotive controllers. The world of personal computers and smart phones is much different from automotive systems. Automotive systems use cost sensitive microcontrollers with limited options for user interaction but possess the power to influence or even control cyber-physical systems. Recent exploits in automotive security have focused attention on authenticated software, authenticating CAN (controller area network) messages, and restricting access to diagnostic commands. Security is important in automobiles as both connectivity and autonomy increases. One security challenge is determining if the ECU (electronic control unit) contains the proper software. For example, before the ECU is allowed to interact with the physical world, during the start process the integrity of the software should be checked at each boot. However, the tight time requirements placed upon a real-time safety-critical system create a challenging problem for secure boot in automotive controllers.

SUMMARY

The present disclosure provides, among other things, a system for verifying the integrity of automotive software in a vehicle. In some cases, such a system may be referred to as sampled secure boot (SSB) system. The system includes, in one implementation, an electronic controller. The electronic controller includes a memory and an electronic processor. In the present disclosure, the term "cell" refers to a collection of data. The term "block" refers to a logical group of memory cells. The electronic processor is configured to receive a software image and store the software image in a plurality of memory cells included in the memory. The plurality of memory cells is organized into rows and columns. The electronic processor is also configured to generate a secret key. The electronic processor is further configured to determine a plurality of fingerprints such that each of the plurality of fingerprints includes at least one of the memory cells from each of the rows. The electronic processor is also configured to calculate reference verification values for the plurality of fingerprints. Each of the reference verification values is determined using a one-way cryptographic function with the secret key and data stored in the memory cells included in one of the plurality of fingerprints.

The electronic processor is further configured to receive a power-up signal and randomly select one of the plurality of fingerprints after receiving the power-up signal. The electronic processor is also configured to retrieve, from the memory, a set of data stored in the memory cells of the selected fingerprint. The electronic processor is further configured to calculate a pre-boot verification value for the selected fingerprint using the one-way cryptographic function with the secret key and the retrieved set of data. The electronic processor is also configured to compare the pre-boot verification value to the reference verification value for the selected fingerprint. The electronic processor is further configured to release a security halt on the software image when the pre-boot verification value matches the reference verification value for the selected fingerprint. The electronic processor is also configured to generate a security warning signal when the pre-boot verification value does not match the reference verification value for the selected fingerprint.

The present disclosure also provides a method for verifying integrity of automotive software in a vehicle. The method includes receiving a software image at an electronic controller of the vehicle and storing the software image in a plurality of memory cells. The plurality of memory cells is organized into rows and columns. The method also includes generating a secret key. The method further includes determining a plurality of fingerprints such that each of the plurality of fingerprints includes at least one of the memory cells from each of the rows. The method also includes calculating reference verification values for the plurality of fingerprints. Each of the reference verification values is determined using a one-way cryptographic function with the secret key and data stored in the memory cells included in one of the plurality of fingerprints. The method further includes receiving a power-up signal and randomly selecting one of the plurality of fingerprints after receiving the power-up signal. The method also includes retrieving a set of data stored in the memory cells of the selected fingerprint. The method further includes calculating a pre-boot verification value for the selected fingerprint using the one-way cryptographic function with the secret key and the retrieved set of data. The method also includes comparing the pre-boot verification value to the reference verification value for the selected fingerprint. The method further includes releasing a security halt on the software image when the pre-boot verification value matches the reference verification value for the selected fingerprint. The method also includes generating a security warning signal when the pre-boot verification value does not match the reference verification value for the selected fingerprint.

The present disclosure further provides a vehicle. The vehicle includes, in one implementation, an electronic controller. The electronic controller includes a memory and an electronic processor. The electronic processor is configured to receive a software image and store the software image in a plurality of memory cells included in the memory. The electronic processor is also configured to organize the plurality of memory cells into rows and columns and generate a secret key. The electronic processor is further configured to determine a plurality of fingerprints such that each of the plurality of fingerprints includes at least one of the memory cells from each of the rows. The electronic processor is also configured to calculate reference verification values for the plurality of fingerprints. Each of the reference verification values is determined using a one-way cryptographic function with the secret key and data stored in the memory cells included in one of the plurality of fingerprints. The electronic processor is further configured to receive a power-up signal and randomly select one of the plurality of fingerprints after receiving the power-up signal. The electronic processor is also configured to retrieve, from the memory, a set of data stored in the memory cells of the selected fingerprint. The electronic processor is further configured to calculate a pre-boot verification value for the selected fingerprint using the one-way cryptographic function with the secret key and the retrieved set of data. The electronic processor is also configured to compare the pre-boot verification value to the reference verification value for the selected fingerprint. The electronic processor is further configured to release a security halt on the software image when the pre-boot verification value matches the reference verification value for the selected fingerprint. The electronic processor is also configured to generate a security warning signal when the pre-boot verification value does not match the reference verification value for the selected fingerprint.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations, and explain various principles and advantages of those implementations.

Figure 1:
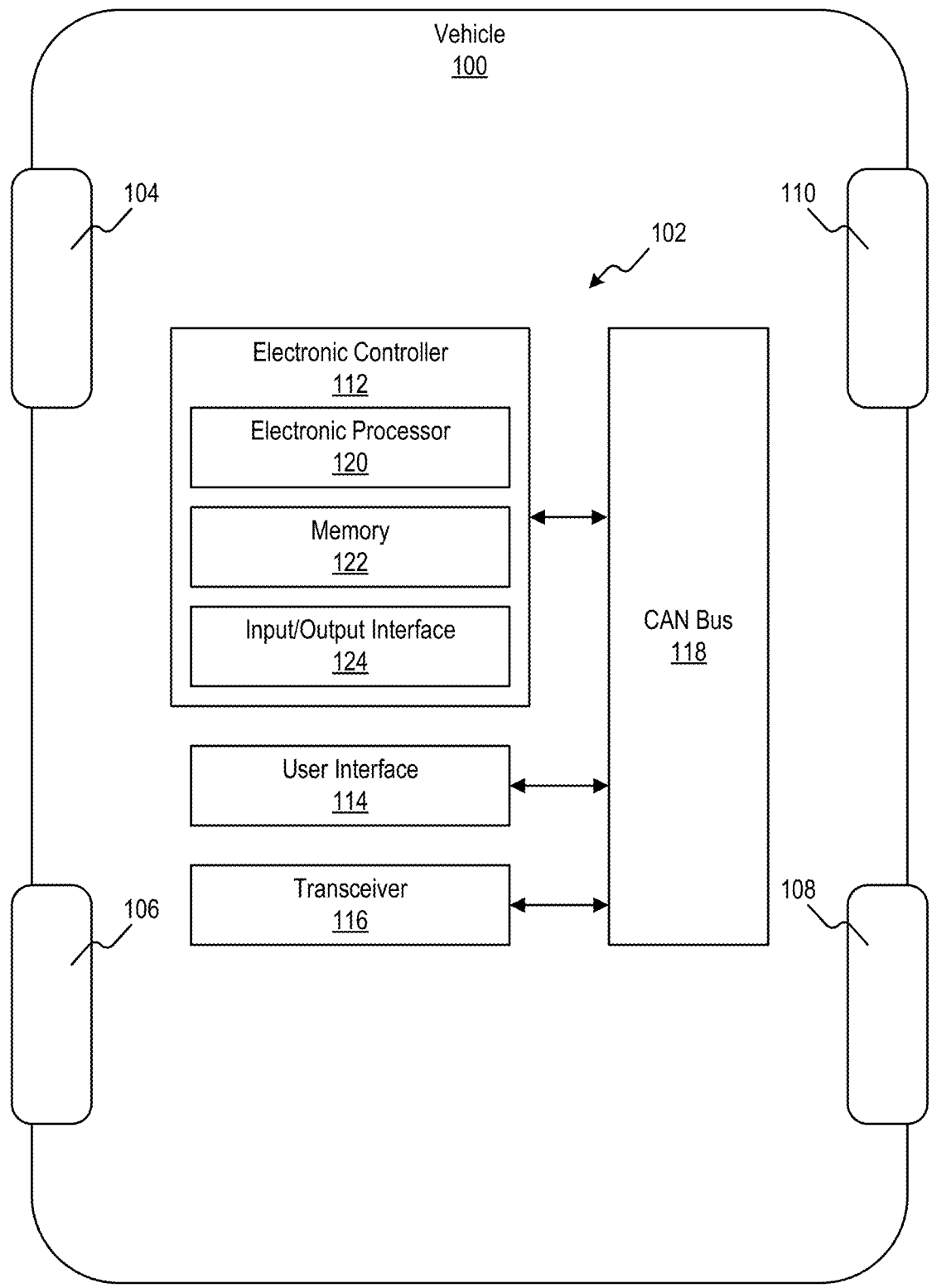
FIG. 1 is a block diagram of one example a vehicle equipped with a system for verifying integrity of automotive software, in accordance with some implementations.

The system and method components have been represented where appropriate by conventional symbols in the drawings, showing only those specific details that are pertinent to understanding the implementations so as not to obscure the disclosure with details that will be readily apparent to those of ordinary skill in the art having the benefit of the description herein.

DETAILED DESCRIPTION

FIG. 1 is a block diagram of one example of a vehicle 100 equipped with a system 102 for verifying integrity of automotive software. The vehicle 100 illustrated in FIG. 1 is an automobile that includes four wheels 104, 106, 108, and 110. In some implementations, the system 102 is equipped to a vehicle with more or less than four wheels. For example, the system 102 may be equipped to a motorcycle, a truck, a bus, a trailer, and the like. In practice, the vehicle 100 includes additional components such as a propulsion system, a steering system, a braking system, and the like. For ease of explanation, these additional components are not illustrated here. Although the present description is targeted to automobile software, the invention is also applicable in other embedded control systems and Internet of Things (IoT) devices.

The system 102 illustrated in FIG. 1 includes an electronic controller 112 (for example, an electronic control unit), a user interface 114, a transceiver 116, and a controller area network bus (for example, CAN bus 118). In some implementations, the system 102 includes fewer or additional components in configurations different from the one illustrated in FIG. 1. For example, in practice, the system 102 may include additional components such as driving systems, and the like. For ease of explanation, these additional components are not illustrated here. In some implementations, the system 102 is wholly or partially contained within the vehicle 100.

The electronic controller 112 illustrated in FIG. 1 includes an electronic processor 120 (for example, one or more microprocessors, application-specific integrated circuits (ASICs), systems-on-a-chip (SoCs), or other electronic controllers), memory 122, and an input/output interface 124. The components included in the electronic controller 112 are coupled to each other via one or more buses (not shown). The memory 122 includes, for example, read only memory (ROM), random access memory (RAM), an electrically erasable programmable read-only memory (EEPROM), other non-transitory computer-readable media, or a combination thereof. In some implementations, the memory 122 is included in the electronic processor 120. The electronic processor 120 is configured to retrieve computer-readable instructions and data from the memory 122 and execute the computer-readable instructions to perform the functionality and methods described herein. The input/output interface 124 includes routines for transferring data between components within the electronic controller 112 and components external to the electronic controller 112. The input/output interface 124 is configured to transmit and receive data via one or more wired couplings (for example, wires, optical fiber, and the like), wirelessly, or a combination thereof. For example, the input/output interface 124 is configured to transmit and receive data via one or more wired couplings to the CAN bus 118.

The user interface 114 includes, for example, one or more input mechanisms (for example, a touch screen, a keypad, a button, a knob, and the like), one or more output mechanisms (for example, a display, a speaker, and the like), or a combination thereof. In some implementations, the user interface 114 includes a touch-sensitive interface (for example, a touch-screen display) that displays visual output generated by software applications executed by the electronic processor 120. Visual output includes, for example, graphical indicators, lights, colors, text, images, graphical user interfaces (GUIs), combinations of the foregoing, and the like. The touch-sensitive interface also receives user input using detected physical contact (for example, detected capacitance or resistance). In some implementations, the user interface 114 is separated from the system 102.

The transceiver 116 includes routines for transferring information between components within the system 102 and components external to the system 102. The transceiver 116 is configured to transmit and receive signals wirelessly using, for example, Wi-Fi, Bluetooth, cellular networks, telematic networks, and the like. In some implementations, the transceiver 116 is further configured to transmit and receive signals via one or more wired couplings (for example, wires, optical fiber, and the like).

Microprocessors and microcontrollers follow a process called bootstrapping or just booting when they begin operation. The first step is to load a small program, called a boot manager, from a dedicated portion of memory that allows the controller to interact with the memory, load critical drivers, perform safety checks, set the clock speed and engage the safety monitors. Then, the boot manager loads a larger program called a boot loader, which loads more drivers and the kernel, which is the core of the operating system.

Typical vehicle architectures allow ECUs only 100 to 250 milliseconds to boot up. If the delay exceeds this time, drivers begin to perceive the vehicle as sluggish and unresponsive. Many automotive ECUs have flash inside the microcontroller and do not require loading the program into RAM from a hard drive. The boot process typically contains safety related checks such as verifying that the RAM and flash do not have any failures and initializing the system operating variables. The boot process is usually considered complete when the module begins sending messages on the CAN bus to notify other modules that it is working properly.

Some microcontrollers include Hardware Trust Anchors (HTAs) such as a hardware secure module (HSM). Some HSMs have an independent, dedicated core inside the microcontroller with protected flash for code and key storage, protected RAM for variables, a hardware accelerator that supports AES, true and pseudorandom number generators, and a few other security-supporting features. Typical core automotive controllers contain 1 to 8 megabytes (MB) which can reasonably be expected to double in the next 5 years. Current HSMs require up to a second to complete an entire image check. Out of all the ECUs found in automobiles, infotainment systems are the most recognizable for security experts. They may even run a version of Linux, support multiple HDMI outputs and touch screens, Bluetooth, USB and Wi-Fi, and offer users the opportunity to customize the interface and download apps. They are not responsible for carrying out safety-critical functions, and while a two-second delay would be unacceptable for steering, it is much more tolerable for a radio. It is also possible for the system to begin the boot procedure when the vehicle is unlocked, masking the delay from the time that the driver starts the vehicle.

Gateway controllers also have a strong security focus, more powerful processors and are considered candidates for more extensive memory checks during the boot phase. These modules do not directly interact with the physical world, they tend to have multiple CAN, Ethernet, and other communication busses, but do not drive motors or valves. Start speed is important for these modules, as the other modules in the vehicle cannot communicate without the gateway functioning.

Automotive controllers can be grouped into four classes from a security perspective. Infotainment systems and transceiver units tend to use automotive grade microprocessors running a more standard operating system like Linux or QNX. Gateway controllers connect multiple CAN and Ethernet busses and route messages from one bus to another. Gateway controllers segment the vehicle network into isolated subnets and enhance two different, unrelated functions, security and bandwidth. Segmenting the modules into clusters of similar functions and security criticality provides isolation to limit the impact of a potential compromise of a module. Separating the modules into clusters exchanging frequent messages allows the use of low-cost busses. Gateway controllers do not interact directly with the vehicle, their main function is to receive, route, scan, transmit, and block messages.

Automotive core ECUs with safety relevant features such as engine, braking, and steering controllers use real-time operating systems. Real-time operating systems have a system of loops that cycle in regular time increments. Since the ECU is intricately linked with the vehicle, the hardware and software designs have to efficiently model the way the physical characteristics of the system. For example, in a car with a vehicle yaw rate time constant of 500 milliseconds, the braking controller would update the vehicle inertial model once every 100 milliseconds. And if the wheel rotational inertia time constant is 50 milliseconds, the braking controller would update target pressures on each wheel every 10 milliseconds. Updating the target wheel pressure every 1 millisecond would create a significant computational load, but not bring a measurable improvement in performance. Waiting 100 milliseconds to update the target wheel pressure every 100 milliseconds would impact control performance.

There are also very simple systems, sometimes with just 8-bit microcontrollers with very aggressive pricing targets. Examples of this type of module include seat controllers and window lift modules. These systems may not use an operating system and they may also not have as stringent boot time requirements, but a signature check takes a significant amount of time.

Security gateways build a clear demarcation between the "clean" and "dirty" sides of the vehicle communication network. The "dirty" side is characterized by user interactivity and connectivity. It consists of the modules and interfaces supporting connectivity and user configurability. The OBDII port is a government mandated diagnostic interface required for all vehicles with engines that produce emissions. This interface provides researchers and attackers with a rich resource to examine how vehicle interfaces function and also a powerful attack surface that can be used to gain access to the vehicle bus. Other systems that connect to Wi-Fi, Bluetooth, or cellular connectivity present an even more significant risk as the attacker would not require physical access to the vehicle. Infotainment systems allow users to interact with the vehicle or even load new software. Modern car buyers expect this functionality, but also expect that the vehicle will remain secure.

The "clean" side is characterized by implicit trust and isolation from users. The braking controller builds a model of the actual vehicle behavior and compares it with the driver intent. When the braking controller receives the driver requested steering angle from the steering controller, it uses these data to determine if the driver is beginning to lose control of the vehicle. These decisions are responsible for saving the lives of more than six thousand people in Europe from 1995 to 2014 and NHTSA estimates that it eliminates 88% of roll over events on light trucks. With lifesaving information being exchanged, the core automotive modules need to be able to trust that the information is coming from the authentic source. Engine controllers, braking controllers, steering controllers, and airbag controllers are examples of modules that are placed on the "clean" side.

A basic gateway architecture would isolate the interactive systems from the rest of the vehicle and limit the exposure of an attack to systems that do not endanger the safety of the vehicle. There are messages that should be allowed to cross domains, for example the vehicle speed is generated on the "clean" side but is transmitted to the "dirty" side to increase the radio volume as the car is driven at high speeds. The gateway can serve as the primary authentication device for vehicle diagnostics with more security enhancements than some other devices.

A more sophisticated architecture segments the vehicle into clusters of modules grouped by security sensitivity and message exchange frequency. With five to ten different CAN and Ethernet busses, a gateway isolates with more granularity and provides an additional layer of security to support safety for the life of the vehicle. The gateway can restrict information flow so that compromised modules cannot spread their influence on other segments of the vehicle. It also provides a good home for potential future intrusion detection systems.

Some vehicles offer several options for, what was just recently, an almost universally consistent procedure. For the better part of a century, the driver would enter the vehicle, insert a unique key and then turn it. Until this happened, the entire vehicle would be "OFF." Any ECUs would be drawing very little current. The introduction of remote keyless entry allowed the driver to unlock the vehicle within the line of sight. This trigger was used by some OEMs to start the boot process of several critical ECUs. This was expanded to support remote start. Other vehicles allow a driver to just enter a vehicle and push a button or even with a smart phone to start via a command over an app. It is important to tightly control quiescent current draw, as a driver returning from an exhausting trip to a deserted parking lot in the middle of winter does not welcome a car battery with insufficient energy to start the vehicle.

From the moment a driver pushes the start button, the vehicle begins a symphony of applying power to the various modules throughout the vehicle. Each module races to execute its boot sequence, initialize its drivers and then begin sending module awake messages on the CAN or Ethernet bus. The individual ECUs need to check their health and prepare for the vehicle to start moving. The engine controller tries to start cranking the engine within about 250 milliseconds, an average driver does not perceive a delay between pressing the start button and the motor springing to life. During the motor crank process, the starter motor draws hundreds or for some vehicles more than a thousand amps. This enormous current draw causes the available voltage at the ECUs to drop from a bit more than 12 Volts to 6 Volts for a short time, even on healthy vehicles. As the cylinders begin to fire and the motor picks up speed, the other ECUs need to be ready to operate.

Further complicating this problem, some OEMs use Vehicle Identification Numbers (VINs), often redundantly referred to as VIN numbers, as an anti-theft mechanism. The engine controller queries the VIN from several modules in physically inaccessible locations before starting the motor. This requires a large portion of the CAN network to be functional within the 250 milliseconds window. The gateway needs to route the messages, the braking and steering controllers need to respond to the queries. The braking controller may need to release the parking brake and the transmission controller may need to respond to the command sent from the body controller indicating forward or reverse.

With the vehicle moving, it is not reasonable to assume that the voltage supply will be constant. When a short interruption occurs, the module must reset quickly. The steering controller must resume operation before the driver loses control of the vehicle. Since an attacker could simulate or initiate a power loss, it is important that the secure boot process also verify the integrity in this case as well.

Some ECUs have a boot manager (for example, smaller than 32 kb) that determines if the module should accept new software, initiate diagnostic commands or enter normal mode. Then a boot loader up to 64 kb in size would setup the system, load drivers, and then hand off operation to the main loop. Unsigned software can be used to gain control of automotive ECUs, or more precisely the lack of a rigid mechanism to only accept signed software.

Safety-relevant system designs implement privilege level in a way to support functional safety requirements and reliability against random failures and software defects. Although some implementations of uCs (microcontrollers) support different privilege levels, implementing an approach with a kernel having elevated privileges and all other applications running with restricted privileges presents several challenges including supporting run time and the ASIL-D rating.

Bouncing between privileged mode and user mode impacts run time as critical registers and internal variables are stored and then recalled. The real-time system must frequently use privileged mode to process interrupts, read inputs and control drivers. Using the safety privilege modes as a security mechanism consumes an enormous portion of the available loop time.

Figure 2:
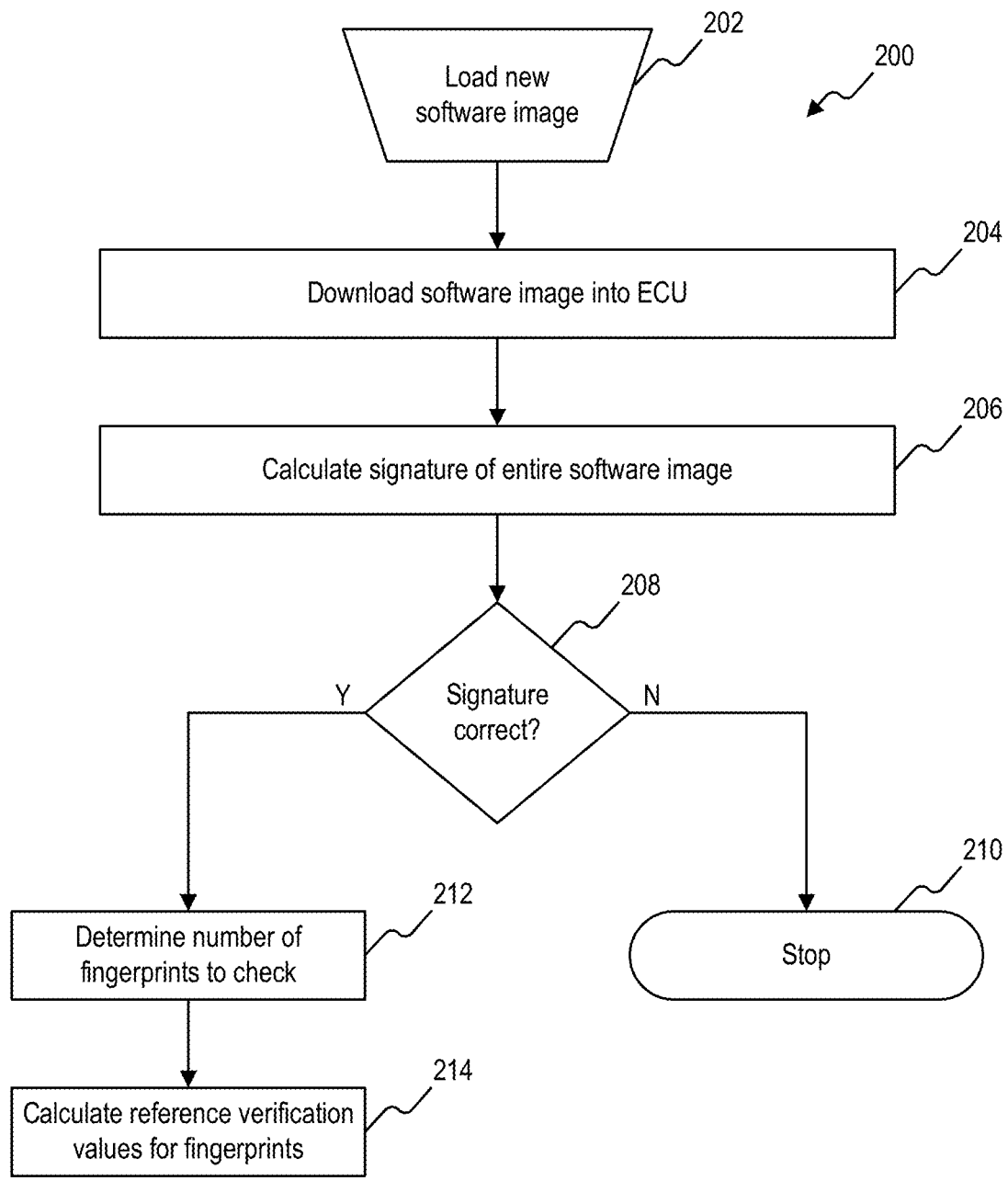
FIG. 2 is flow diagram of one example of a method for verifying integrity of automotive software in a vehicle when a new software image is loaded, in accordance with some implementations.

There are several phases for verification detection to occur. The first phase is when new software is programmed into the ECU. Systems are intended to ensure OTA (over the air) updates deliver unmodified software, but each ECU should perform an integrity check after the new software has been downloaded. Since this happens relatively infrequently, the vehicle is in a passive mode, and the ECU controls when the reflash process will occur, there is ample time for the expected solution of asymmetric key cryptography. FIG. 2 is a flow diagram of one example of a method 200 for verifying integrity of automotive software in the vehicle 100 during a setup phase. At block 202, a new software image is loaded. At block 204, the software image is loaded into the ECU (for example, into the electronic controller 112). At block 206, a signature of the entire software image is calculated. At block 208, the ECU determines whether the signature is correct. When the signature is incorrect, the method 200 stops at block 210. Alternatively, when the signature is correct, a number of fingerprints to check are determined at block 212 as will be described in more detail below. At block 214, reference verification values for the fingerprints are calculated as also will be described in more detail below.

Implementations of an embedded microcontroller may use exclusively built-in flash memory and RAM, and new software must be loaded before the signature can be checked. When the new software is loaded, then a signature check can be done with, for example, a public key or with a symmetric key in protected memory. After this procedure is completed, the accelerated boot process is completed. Table 1 defines the variables used in the processes disclosed herein.

TABLE 1

Variable Definitions

| | |
|---|---|
| Base | Same as n |
| Index | Variable to step through memory |
| ECU_ID | ECU specific key stored inside HSM |
| Key | Cryptographic key |

TABLE 1-continued

Variable Definitions

| | |
|---|---|
| MAC | Message Authentication Code |
| Mem_cell | Individual memory cell being read |
| Mem_Start | Start of memory bank to read |
| Mem_Stop | End of memory bank to read |
| Signature | Signature calculated |
| Step | Step size used in parsing memory |

In the setup phase, the memory is broken up into columns based on the minimum compromised code length. A signature of each column is calculated and then stored in protected memory. A first process described below is one example of pseudocode to setup the signatures with a message authentication code (MAC). The first process can be modified to use SHA.

First Process: Setup Phase - After programming new software

```
Begin Setup_Phase_MAC
    Input Step, Mem_Start, Mem_Stop
    Key = TRNG(128)
    For signature = 0 to Step - 1
        MAC = 0
        For index = (Mem_Start + Step) to Mem_Stop, Step
            Mem_cell = read(index)
            MAC = CBCMAC(key, MAC, Mem_cell)
        Next index
        Store MAC
    Next signature
    Store Key
End
```

In some implementations, instead of building fingerprints from all cells in individual columns, fingerprints are built with randomness. For, example, the cell locations for a fingerprint may be determined using an offset determined by a pseudorandom function that can be reproduced at each boot cycle. In some implementations, the seed for the offset may be determined based on an ECU-specific random number.

In some implementations, the cell locations for a fingerprint are shifted by a pseudorandom number as a row-specific offset. Alternatively, or in addition, the cell locations are shifted by an alternating addition and subtraction of the offset. Alternatively, or in addition, the cell locations are determined by the multiplication of the pseudorandom number and a column-specific offset. Alternatively, or in addition, a pseudorandom number is stored in a look-up table (LUT) to provide a unique pattern of cell locations.

Figure 3:
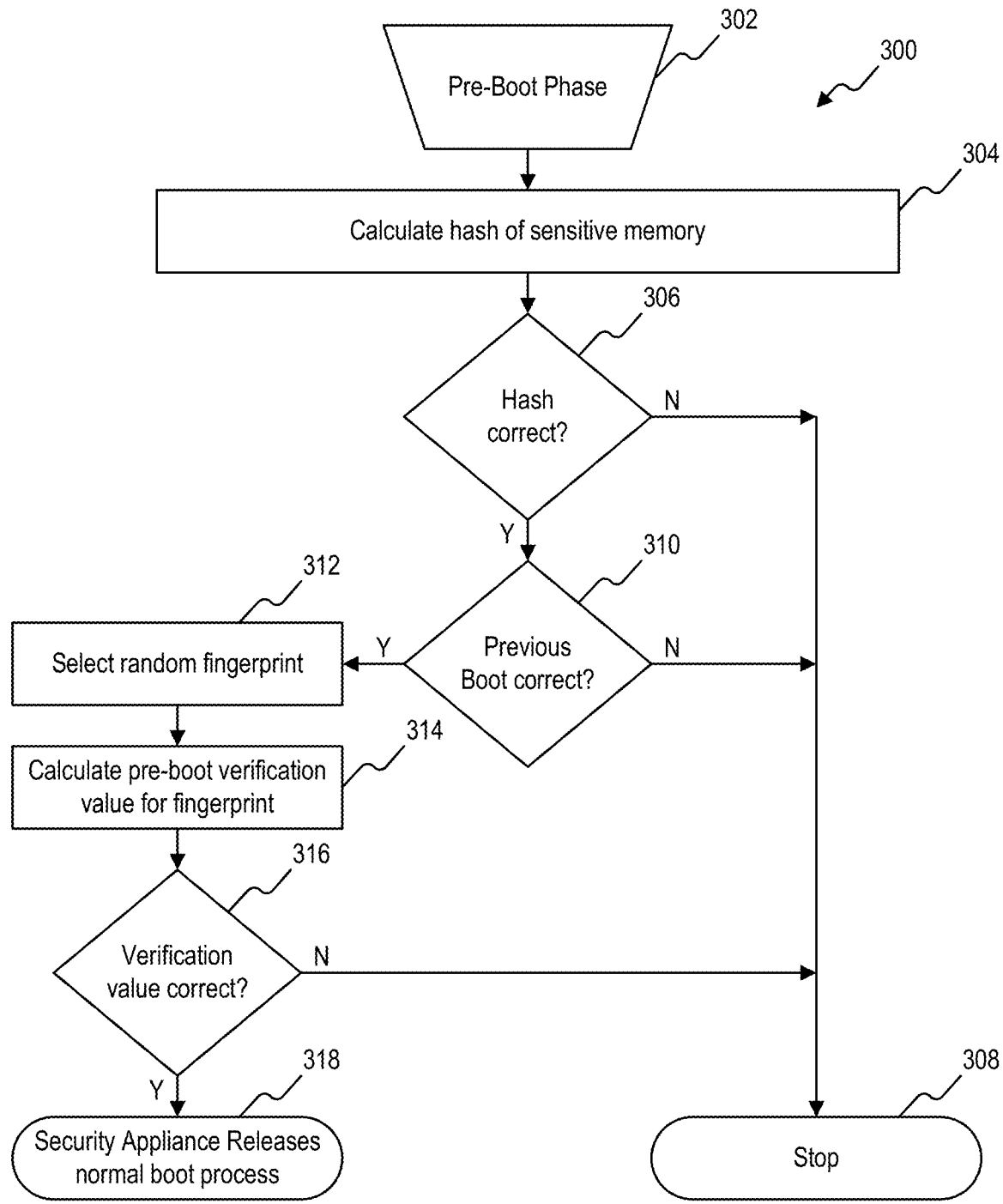
FIG. 3 is flow diagram of one example of a method for verifying integrity of automotive software in a vehicle during a pre-boot phase, in accordance with some implementations.

Before the ECU is allowed to interact with the physical world, during the start process the integrity of the software should be checked at each boot. FIG. 3 is a flow diagram of one example of a method 300 for verifying integrity of automotive software in the vehicle 100 during a pre-boot phase. At block 302, the pre-boot phase begins. In some implementations, the pre-boot phase begins responsive to receiving a power-up signal (for example, a vehicle ignition signal). At block 304, a hash of sensitive memory is calculated. Sensitive memory may include, for example, HSM firmware, a bootloader, and a critical configuration. At block 306, the ECU determines whether the hash is correct. When the hash is not correct, the method 300 stops at block 308. Alternatively, when the hash is correct, the ECU determines whether previous boot was correct at block 310. When the previous boot was not correct, the method 300 stops at block 308. Alternatively, when the previous boot was correct, a random fingerprint is selected at block 312. At block 314, a pre-boot verification value for the selected fingerprint is calculated as will be described in more detail below. At block 316, the ECU determines whether the verification value is correct. When the verification value is not correct, the method 300 stops at block 308. Alternatively, when the verification value is correct, the security appliance releases the normal boot process at block 318.

At each ignition cycle, a column to check is selected at random and then the signature for that column is computed and then compared with the signature stored in the protected memory. A second process described below is one example of the pre-boot phase. When the microcontroller starts up, the HSM holds the main core in reset until it completes its initialization phase. At the beginning of this phase, the HSM can check that it can operate in a safe and trusted manner. The check for this process begins with randomly selecting which of the pre-computed columns to check for this ignition cycle.

Second Process: Boot Phase - Setup each time

```
Begin Preboot_Check_MAC
    Input Step, Mem_Start, Mem_Stop, Key
    Search = RND (Step)
    AC = 0
    Check = Read(Full_Signature_Status)
    If Check == Failed Then
        Halt
    Else
        For index = (Mem_Start + Search) to Mem_Stop, Step
            Mem_cell = read(index)
            MAC = CBCMAC(key, MAC, Mem_cell)
        Next index
        Stored_Signature = Read (Search)
        If MAC == Stored_Signature Then
            Return (Signature_Passed)
        Else
            Store (Signature_Failed)
            Halt
End
```

Figure 4:
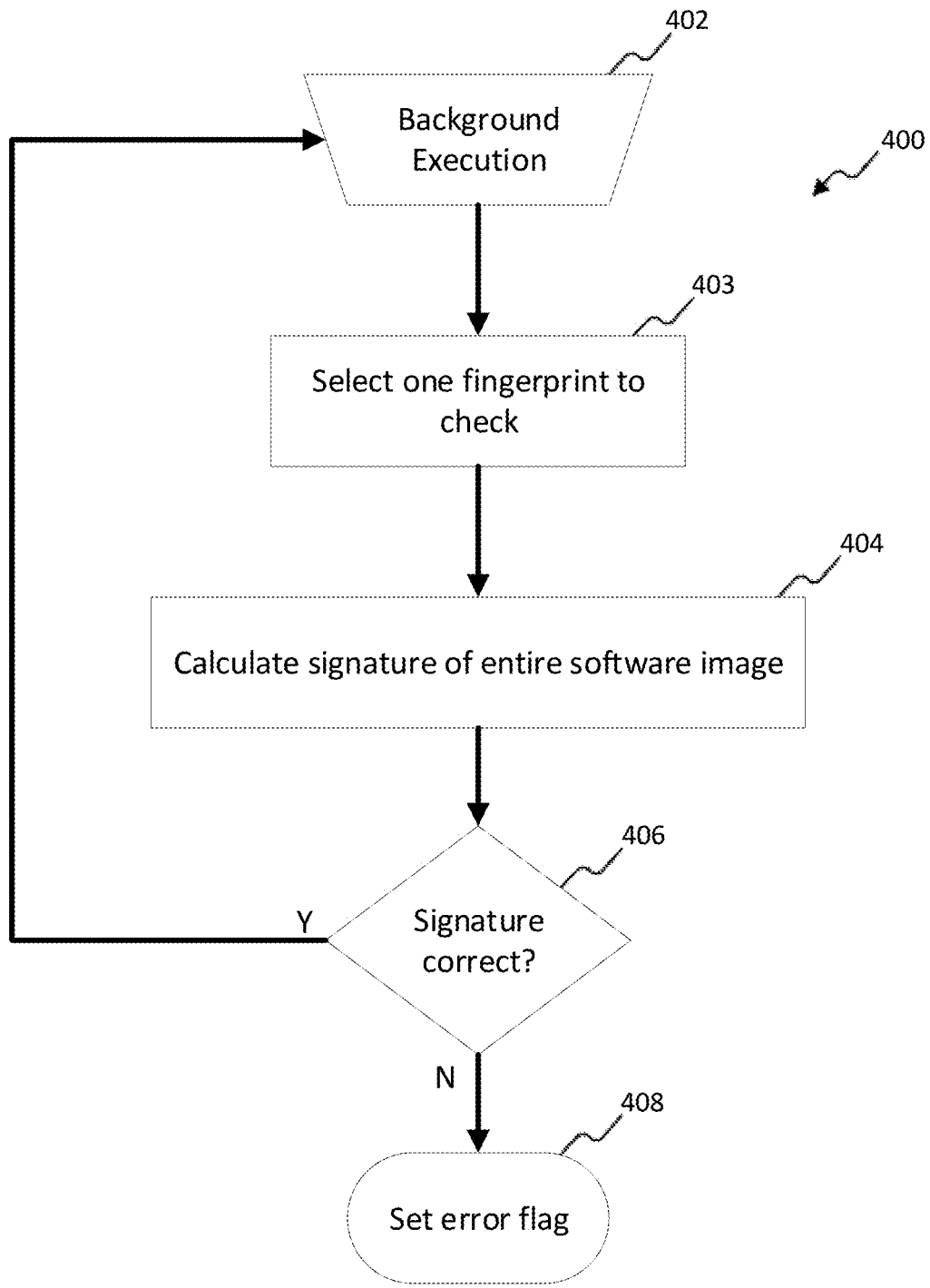
FIG. 4 is flow diagram of one example of a method for verifying integrity of automotive software in a vehicle during run-time, in accordance with some implementations.

After the ECU has completed the boot phase, continuous run-time detection of compromised software can execute in the background. FIG. 4 is a flow diagram of one example of a method 400 for verifying integrity of automotive software in the vehicle 100 during run-time. The verification begins during background execution at block 402. At block 403, one fingerprint to check is selected. At block 404, a signature of the entire software image is calculated. At block 406, the ECU determines whether the signature is correct. When the signature is not correct, an error flag is set at block 408. Alternatively, when the signature is correct, the method 400 returns to block 402 and background execution continues.

A third process described below is one example of an additional phase to enhance security while still meeting the safety requirements. It is possible to compare the signature of the current image with the original signature associated with the software package in the background. If an anomaly in the image is detected, then the HSM will not be able to override the ASIL rated safety core, but it will limit the potential influence of the compromised software to a single ignition cycle. At the succeeding ignition cycle, the HSM core will detect that the image check was not passed, and the HSM can safely exert control over the main controller.

Third Process: Background Check - During normal operation

```
Begin Postboot_Check_MAC
```

Third Process: Background Check - During normal operation

```
Input Mem_Start, Mem_Stop, Key
MAC = 0
For index = Mem_Start to Mem_Stop
  Mem_cell = read(index)
  MAC = CBCMAC(key, MAC, Mem_cell)
Next index
Read (Stored_Signature)
If MAC == Stored_Signature Then
  Store (Full_Signature_Status = Passed)
  Return (Full_Signature_Passed)
Else
  Store (Full_Signature_Status = Failed)
  Return (Full_Signature_Failed)
End
```

Figure 5:
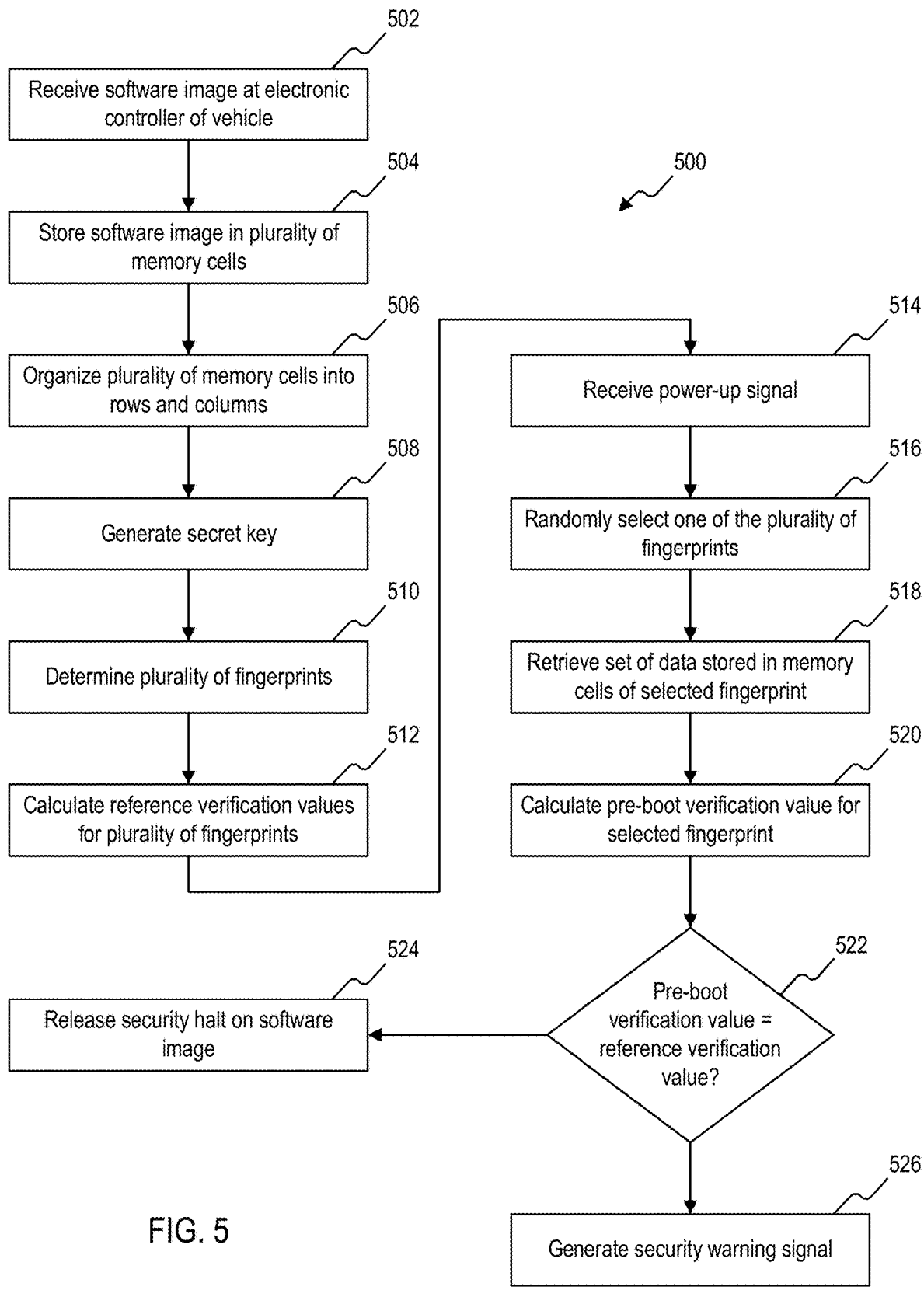
FIG. 5 is flow diagram of one example of a method for verifying integrity of automotive software in a vehicle, in accordance with some implementations.

FIG. 5 is a flow diagram of one example of a method 500 for verifying integrity of automotive software in the vehicle 100. At block 502, a software image is received at the electronic controller 112 of the vehicle 100. At block 504, the software image is stored in a plurality of memory cells included, for example, in the memory 122. At block 506, the plurality of memory cells is organized into rows and columns. In some implementations, the plurality of memory cell is organized into rows and columns such that a total number of the memory cells in each of the rows is less than or equal to a minimum compromised code length. At block 508, a secret key is generated. The secret key is stored, for example, in the memory 122. In some implementations, the secret key is stored in a protected portion of the memory 122 (or in a protected memory).

At block 510, a plurality of fingerprints is determined such that each of the plurality of fingerprints includes at least one of the memory cells from each of the rows. In some implementations, the plurality of fingerprints is determined such that each of the plurality of fingerprints includes all of the memory cells from one of the columns. Alternatively, or in addition, the plurality of fingerprints is determined such that each of the plurality of fingerprints includes one of the memory cells from at least two of the columns. Alternatively, or in addition, the plurality of fingerprints is determined such that each of the plurality of memory cells are included in at least one of the plurality of fingerprints. Alternatively, or in addition, the plurality of fingerprints is determined such that a sampling variation is less than a threshold.

In some implementations, the sampling variation is such that each cell is protected by multiple fingerprints (oversampling approach). Alternatively, or in addition, knowing that the compromised segments of code have a minimum length w, every $w^{th}$ cell is sampled (skipping approach). Alternatively, or in addition, recently unchecked cells are favored to be sampled (hybrid approach).

At block 512, reference verification values are calculated for the plurality of fingerprints. Each of the reference verification values is determined using a one-way cryptographic function with the secret key and data stored in the memory cells included in one of the plurality of fingerprints. The one-way cryptographic function includes, for example, a message authentication code, a hash, and the like. The reference verification values are stored, for example, in the memory 122. In some implementations, the reference verification values are stored an unprotected portion of the memory 122 (or in an unprotected memory).

At block 514, a power-up signal is received. In some implementations, the power-up signal includes a vehicle ignition signal. At block 516, one of the plurality of fingerprints is randomly selected after receiving the power-up signal. At block 518, a set of data stored in the memory cells of the selected fingerprint is retrieved. At block 520, a pre-boot verification value for the selected fingerprint is calculated using the one-way cryptographic function with the secret key and the retrieved set of data. At block 522, the pre-boot verification value is compared to the reference verification value for the selected fingerprint. When the pre-boot verification value matches the reference verification value for the selected fingerprint, a security halt on the software image is released at block 524. Alternatively, when the pre-boot verification value does not match the reference verification value for the selected fingerprint, a security warning signal is generated at block 526. In some implementations, the security warning signal results in an audio and/or visual notification being generating by the user interface 114 to inform a passenger of the vehicle 100. In some implementations, the security warning signal results in the vehicle 100 being placed in a safe-mode or a restricted operation mode.

The detection rate for these processes described herein may be $\Delta = t/b$, where t is the length of the contiguous block of compromised code and b is the block length. If we are able to set b≤t, then we can guarantee that the modified code would be detected. From an engineering perspective, the minimum value of b will be determined by the available time for computing the fingerprint of the memory. Decreasing b will have a linear increase in the number of cells to check and hence the time to compute the fingerprint. Decreasing b will also have a linear increase in the likelihood of detecting compromised software but will have a linear increase in the protected memory space requirement. These processes disclosed herein front load the computation of the b fingerprints, not so much because of availability of computational time during the flash process, but because during the reprogramming process security controls are more tightly controlled.

After an attacker learns that a fixed search pattern is being used, the attacker could craft their attack pattern in a manner to minimize the risk of detection. In Table 2, the attacker uses two- and three-byte instructions and then a three-byte jump instruction to go to the next block of code. The compromised execution cells include an 'x,' the jump commands include a 'y.' By doing this, the attacker is able to reduce the likelihood of detection of a ten-byte program from 10/b to 6/b on a single check. In practice, it is complicated to scatter the compromised code without affecting operation of other functions.

TABLE 2

Compromised Memory with Jump

| | 0 | 1 | 2 | 3 | 4 | 5 | b-3 | b-2 | b-1 |
|---|---|---|---|---|---|---|---|---|---|
| 0 | x | x | x | y | y | y | | | |
| 1 | x | x | y | y | y | | | | |
| 2 | x | x | y | y | y | | | | |
| 3 | x | x | x | | | | | | |
| d-3 | | | | | | | | | |
| d-2 | | | | | | | | | |
| d-1 | | | | | | | | | |

Let d be the number of blocks. The product of b and d must exceed the memory space. As b shrinks, d grows, and the time required to perform the check grows linearly. The minimum value of b is limited by the available time for the check in the boot phase. As b grows, the minimum size of the guaranteed detection length also grows. The memory space required to store the images also grows linearly. From an engineering perspective, there should be a range of potential suitable bases. Having each ECU randomly select b can increase the difficulty for the attacker to craft her attack, but the range is probably on the order of 10, with millions identical ECUs, the key space is insufficient to significantly increase the effort required for an attacker to compromise the system.

In some implementations, two bases are selected instead of just one. For example, a check may be performed at a randomly selected i and then a second check performed at i+b/2.

Since unused memory at the end of a block in flash is usually left in an erased state so that it can be programmed later. Shannon's entropy for a binary string is given by Equation 1.

$$H = \sum_{i=0}^{B-1} p(x_i) \log_2 p(x_i) \qquad \text{Equation 1}$$

For the example, b is the length of the unused memory and $p(x_i)$ is the probability of $x_i$ being predictable, which is 1 for this string. The value of $\log_2 p(x_i)$ is naturally 0, so the sum is also 0. With the univalence of the unused memory space entropy, performing a cryptographically robust check offers no benefit. Since the cells are easily modified to arbitrary values, the value of the memory to an attacker may be higher than programmed memory and could benefit from a targeted check. It is also likely that there are multiple sections of unused memory.

Optimization of the firmware integrity check allows verification of different categories of memory space with different algorithms. From a cryptography perspective, this is not an interesting endeavor, unless there is a means to quickly verify that a section of memory remains cleared. One possible option would be to run the check on the main core with a trusted software module early in the boot process, while the HSM is checking the signature of the boot loader or kernel.

Figure 6:
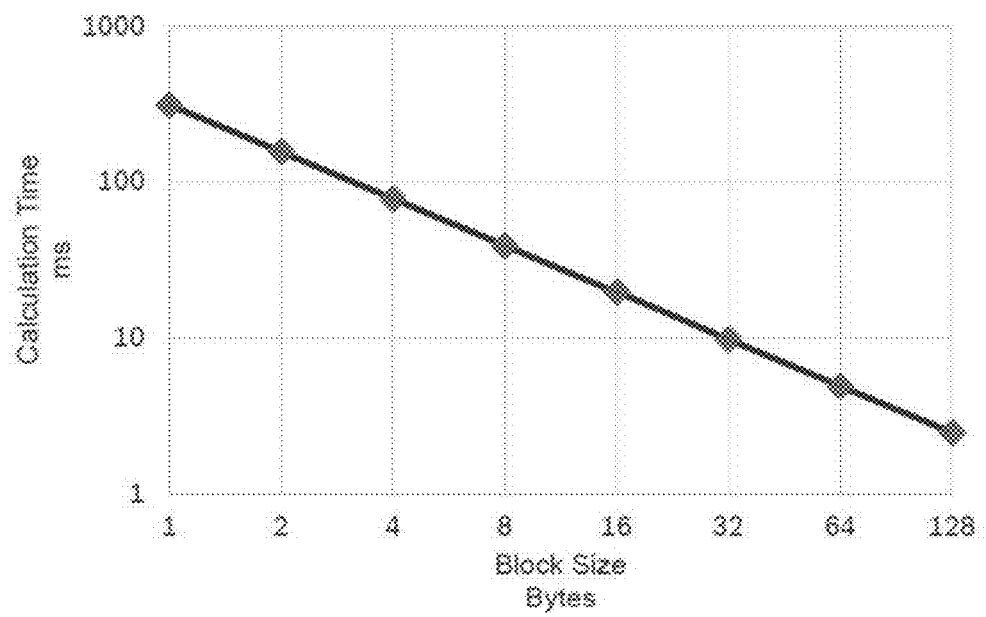
FIG. 6 is a graph of example measured times to compute a message authentication code for a 1-megabyte section of code with varying sampling sizes.

FIG. 6 shows a graph of an example measured times to compute a CBC-MAC for a 1 MB section of code with sampling a single byte per block with varying block sizes. Each block size was measured three times, the maximum spread was 0.04% among the three measurements. The data points fall very close to a straight line. A curve fitting algorithm can describe the time required to calculate the MAC for 1 MB by Equation 2. The time is inversely proportional to the block size.

Calculation Time=(311 ms)/(Block Size)

Equation 2—MAC Calculation Time

The linearity indicates that the delays from loading the memory or processing the step sizes are minimal. If, for example, restructuring the bytes of data into the appropriate chunks for the MAC took a significant amount of time, the time from a step size of 1 to 2 wouldn't have been halved. If an ECU with 4 MB of memory and 40 milliseconds available for the secure boot process, a minimum block size of 32 bytes would be supported.

In some implementations, the main core is utilized to perform some of the functions faster than having just the HSM do everything. Having the HSM core identify which random index to use for the ignition cycle and then delegating the task to the main core to read the flash and copy into RAM could accelerate the process by task segmentation or parallelization.

Sampled checks trade off the number of cells modified, the number of cells checked, and the detection escape rate. Since they are not exhaustive, they cannot guarantee detection for every modification. Critical cells that have the authority to bypass security measures should be checked on every boot cycle. The majority of cells do not control security functions. To evaluate the effectiveness of the system, let z be the number of cells the adversary needs to modify to achieve her objective. Let b be the number of cells in each data block. Let d be the number of blocks. A security engineer may need to balance the minimum start up time improvement factor with the target maximum escape rate. As an example, a microcontroller with 8 megabytes of on-chip memory is considered. As an example, a cell is considered as a word of 4 bytes, and assume that the adversary needs to change 0.01% of the cells, therefore z=200 words. As an example, the security engineer selects b=64.

For an executable code modification, let v be the number of blocks with compromised cells and w be the number of compromised cells in each block. If w≥b, then detection is guaranteed. For the case where w<b, each segment, save the last, requires a jump command linking it to the next segment. The adversary can modify v segments, each with $$w = \left\lceil \frac{z + v - 1}{v} \right\rceil$$

compromised cells.

Figure 7:
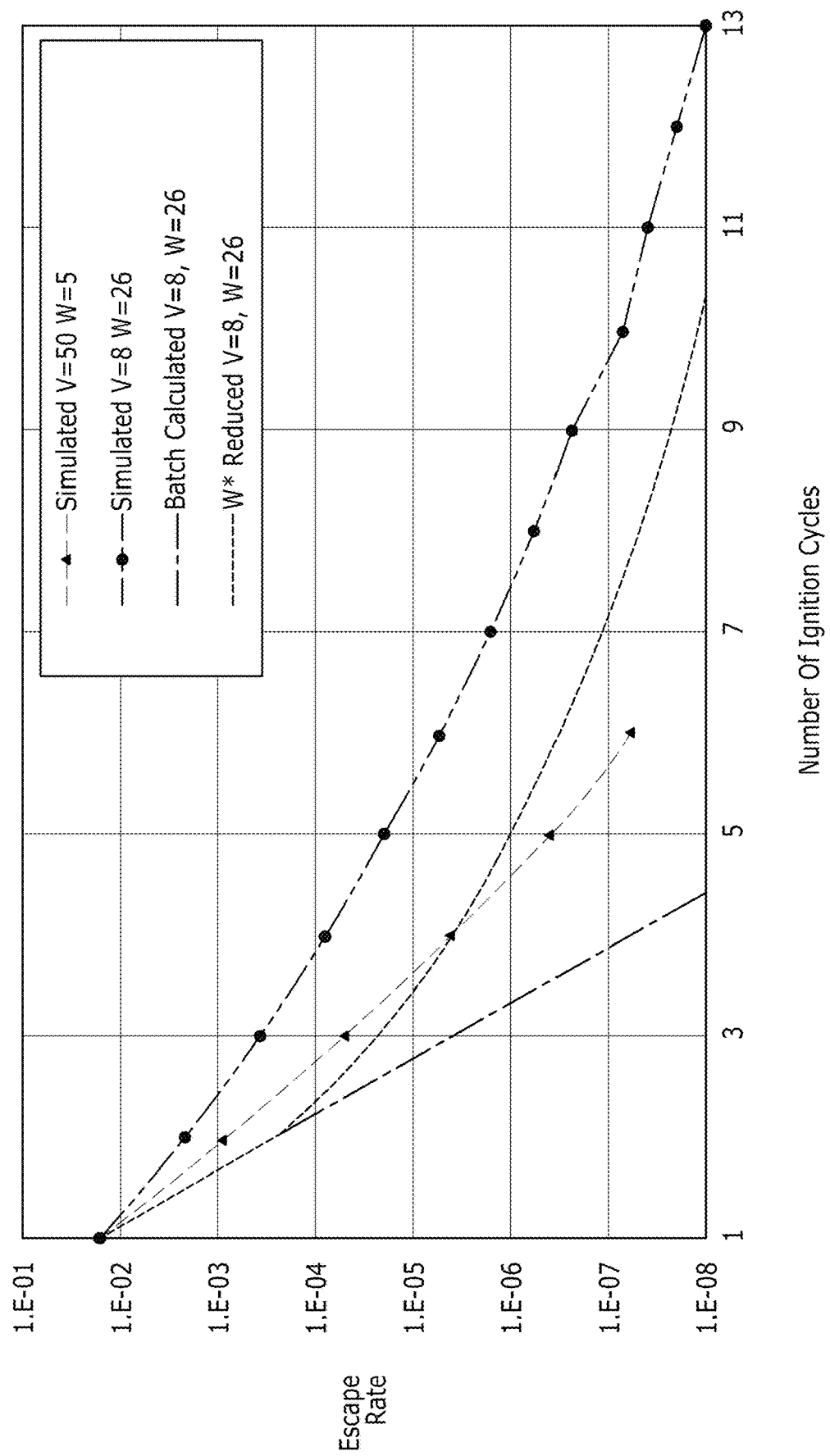
FIG. 7 is a graph depicting the simulated and calculated detection escape rates over multiple ignition cycles.

FIG. 7 depicts the escape rate over multiple ignition cycles for the worst-case configuration with 200 active modified cells (v=8 segments of w=26 cells) and one slightly better configuration (v=50 segments of w=5 cells). The initial escape rate is approximately 1.5%, but as the number of ignition cycles increases, the verification method does not detect as well as the unconstrained random patterns: the SSB escape rate is 0.2% on the second cycle and 0.03% on the third.

The SSB can also be modeled as mapping the cells from each block onto a fingerprint. If the verify algorithm selects a fingerprint which samples a modified cell, detection will be successful. As an example, the comparable escape rate with all the compromised cells in a single block w* is determined by setting the escape rates the same:

$$Pr(Escape_m) = \left(1 - \frac{\omega}{b}\right)^{u \times m} = \left(1 - \frac{\omega^*}{b}\right)^m$$

$$\omega^* = b\left(1 - \left(1 - \frac{\omega}{b}\right)^u\right)$$

Since the SSB reuses instead of regenerates the samples, each time a sample is used it also provides information about the other samples. Each time the boot check fails to detect, the effective value of w* is slightly lower. With this as a model, the leaked information grows logarithmically with the number of compromised segments v. Normalizing to the total number of cells $\frac{w}{b}$ and using an empirically determined scaling constant of 10 reduces the effective number of modified cells by $$1^{-ln(v)\frac{b}{10\times\omega}}$$

on each cycle. The w* curve in FIG. 7 tracks the measured detection rate with this idealized case.

$$Pr(Escape_m) = \prod_{i=1}^{m}\left[\left(1 - \frac{\omega^*\left(1 - \ln(v)\frac{b}{10\times\omega}\right)^{i-1}}{b}\right)^{(i-1)}\right]$$

In experiments, a proof of concept implementation was prepared and run inside an HSM on five automotive ASIL-D rated microcontrollers. Three different Renesas RH850C family controllers were used. Infineon's TC37x and TC39x family controllers were also used. The purpose of the implementation was to evaluate the influence of using a word or byte as the cell size, and varying the block size, the amount of memory processed by the algorithm, and RAM allocated to the buffer. The results of the implementation reduced verification time by a factor of 9 on the Infineon devices and a factor of 23 on the Renesas, bringing the boot time within a range compatible with the safety concept.

In the proof of concept implementation, a block size ranging from 4 to 64 words was considered. Microcontrollers are typically optimized to read contiguous sections of memory into the AES accelerator, which influences the Time Reduction Factor (TRF). TRF is calculated as the ratio of the time required to complete the full image check to a sampled check. Since total memory=b×d, as block size b increases, the number of cells checked and the time to check them decrease.

In this example, the optimum cell size was selected. The initial measurements used bytes for cells, but the HW is optimized to read words (4 bytes) rather than bytes. In the proof of concept implementation, switching to words caused a 51% performance improvement. Using 16-byte long cells to feed the AES engine improves the read rate, but also reduces the effective snippet length w and thus the detection rate. Aligning the cell size to the smallest functional unit in the microcontroller maximizes the length of the code snippet. If a string of cells is compromised, checking all of them does not increase the detection rate over checking just one.

The scheme uses HSM-protected memory and unprotected memory: 128-bit AES key (16 bytes) is stored in protected memory. With b=64, the fingerprints take 1 kB of memory of unprotected memory. With the collision resistant AES key protecting the MAC, knowing or modifying the fingerprints will not allow an adversary to bypass the secure boot check. Unprotected memory is suitable for the fingerprints.

Figure 8:
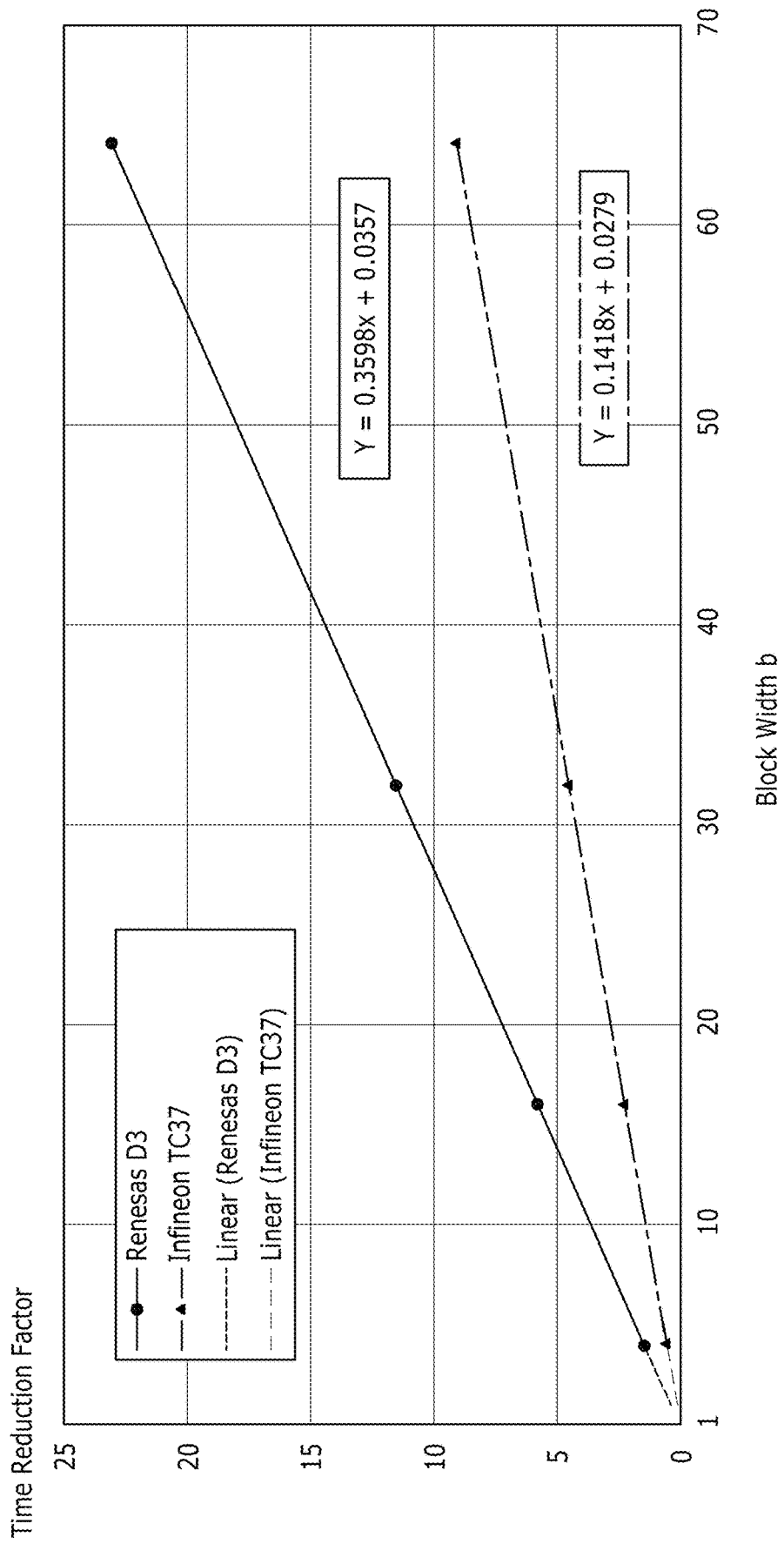
FIG. 8 is a graph depicting a best-case Time Reduction Factor for two families of microcontrollers over multiple block widths in one example.

FIG. 8 depicts the Time-Reduction Factor (TRF) best-case configuration for both the Infineon and Renesas family of microcontrollers, and their corresponding best-fit linear curve match, using the best-case performance for each block size. The Renesas family of microcontrollers provide a constant overhead (0.0357) with the TRF linearly dependent on b (0.3598×b). In other words, the time is reduced by b/2.8. With b=64, this provided a TRF of 23. Since the fingerprint generation is based on a symmetric key, the Setup algorithm takes a bit longer than 2.8 times as calculating an un-sampled CBC-MAC over the entire memory image. For the Infineon TC37x and T39x microcontrollers, the TRF is b/7.1. With b=64, this provided a TRF of 9.

In the foregoing specification, specific implementations have been described. However, one of ordinary skill in the art appreciates that various modifications and changes may be made without departing from the scope of the claims set forth below. Accordingly, the specification and figures are to be regarded in an illustrative rather than a restrictive sense, and all such modifications are intended to be included within the scope of the present disclosure.

It is to be understood that the phraseology and terminology used herein is for the purpose of description and should not be regarded as limiting. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software-based devices, as well as a plurality of different structural components may be utilized to implement the present disclosure. It should also be noted that a plurality of hardware and software-based devices, as well as a plurality of different structural components may be used to implement the present disclosure. In addition, it should be understood that implementations of the present disclosure may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software-based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (for example, a system bus) connecting the components.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

Thus, the present disclosure provides, among other things, systems, methods, and vehicles for verifying automotive software. Various features and advantages are set forth in the following claims.

What is claimed is:

1. A system for verifying integrity of automotive software in a vehicle, the system comprising:
    an electronic controller including a memory and an electronic processor configured to:
        receive a software image,
        store the software image in a plurality of memory cells included in the memory,
        organize the plurality of memory cells into rows and columns,
        generate a secret key,
        determine a plurality of fingerprints such that each of the plurality of fingerprints includes at least one of the memory cells from each of the rows,
        calculate reference verification values for the plurality of fingerprints, wherein each of the reference verification values is determined using a one-way cryptographic function with the secret key and data stored in the memory cells included in one of the plurality of fingerprints,
        receive a power-up signal,
        randomly select one of the plurality of fingerprints after receiving the power-up signal,
        retrieve, from the memory, a set of data stored in the memory cells of the selected fingerprint,
        calculate a pre-boot verification value for the selected fingerprint using the one-way cryptographic function with the secret key and the retrieved set of data,
        compare the pre-boot verification value to the reference verification value for the selected fingerprint,
        release a security halt on the software image when the pre-boot verification value matches the reference verification value for the selected fingerprint, and
        generate a security warning signal when the pre-boot verification value does not match the reference verification value for the selected fingerprint.

2. The system of claim 1, wherein the electronic processor is further configured to determine the plurality of fingerprints such that each of the plurality of fingerprints includes all of the memory cells from one of the columns.

3. The system of claim 1, wherein the electronic processor is further configured to determine the plurality of fingerprints such that each of the plurality of fingerprints includes one of the memory cells from at least two of the columns.

4. The system of claim 1, wherein the electronic processor is further configured to determine the plurality of fingerprints such that each of the plurality of memory cells are included in at least one of the plurality of fingerprints.

5. The system of claim 1, wherein the electronic processor is further configured to determine the plurality of fingerprints such that a sampling variation is less than a threshold.

6. The system of claim 5, wherein the sampling variation includes at least one of an oversampling, skipping, or hybrid approach.

7. The system of claim 1, wherein the electronic processor is further configured to determine whether the total number of memory cells in each of the rows is less than or equal to a minimum compromised code length.

8. The system of claim 1, wherein the one-way cryptographic function includes at least one of a message authentication code or a hash.

9. The system of claim 1, wherein the electronic processor is further configured to:
    store the secret key in a protected portion of the memory, and store the reference verification values for the plurality of fingerprints in an unprotected portion of the memory.

10. A method for verifying integrity of automotive software in a vehicle, the method comprising:
    receiving a software image at an electronic controller of the vehicle;
    storing the software image in a plurality of memory cells;
    organizing the plurality of memory cells into rows and columns;
    generating a secret key;
    determining a plurality of fingerprints such that each of the plurality of fingerprints includes at least one of the memory cells from each of the rows;
    calculating reference verification values for the plurality of fingerprints, wherein each of the reference verification values is determined using a one-way cryptographic function with the secret key and data stored in the memory cells included in one of the plurality of fingerprints;
    receiving a power-up signal;
    randomly selecting one of the plurality of fingerprints after receiving the power-up signal;
    retrieving a set of data stored in the memory cells of the selected fingerprint;
    calculating a pre-boot verification value for the selected fingerprint using the one-way cryptographic function with the secret key and the retrieved set of data;
    comparing the pre-boot verification value to the reference verification value for the selected fingerprint;
    releasing a security halt on the software image when the pre-boot verification value matches the reference verification value for the selected fingerprint; and
    generating a security warning signal when the pre-boot verification value does not match the reference verification value for the selected fingerprint.

11. The method of claim 10, wherein the plurality of fingerprints is further determined such that each of the plurality of fingerprints includes all of the memory cells from one of the columns.

12. The method of claim 10, wherein the plurality of fingerprints is further determined such that each of the plurality of fingerprints includes one of the memory cells from at least two of the columns.

13. The method of claim 10, wherein the plurality of fingerprints is further determined such that each of the plurality of memory cells are included in at least one of the plurality of fingerprints.

14. The method of claim 10, wherein the plurality of fingerprints is further determined such that a sampling variation is less than a threshold.

15. The method of claim 10, further comprising:
determining whether the total number of memory cells in each of the rows is less than or equal to a minimum compromised code length.

16. The method of claim 10, wherein the one-way cryptographic function includes at least one of a message authentication code or a hash.

17. The method of claim 10, further comprising:
storing the secret key in a protected memory; and
storing the reference verification values for the plurality of fingerprints in an unprotected memory.

18. A vehicle comprising:
an electronic controller including a memory and an electronic processor configured to:
receive a software image,
store the software image in a plurality of memory cells included in the memory,
organize the plurality of memory cells into rows and columns,
generate a secret key,
determine a plurality of fingerprints such that each of the plurality of fingerprints includes at least one of the memory cells from each of the rows,
calculate reference verification values for the plurality of fingerprints, wherein each of the reference verification values is determined using a one-way cryptographic function with the secret key and data stored in the memory cells included in one of the plurality of fingerprints,
receive a power-up signal,
randomly select one of the plurality of fingerprints after receiving the power-up signal,
retrieve a set of data stored in the memory cells of the selected fingerprint,
calculate a pre-boot verification value for the selected fingerprint using the one-way cryptographic function with the secret key and the retrieved set of data,
compare the pre-boot verification value to the reference verification value for the selected fingerprint,
release a security halt on the software image when the pre-boot verification value matches the reference verification value for the selected fingerprint, and
generate a security warning signal when the pre-boot verification value does not match the reference verification value for the selected fingerprint.

19. The vehicle of claim 18, wherein the electronic processor is further configured to determine the plurality of fingerprints such that each of the plurality of fingerprints includes all of the memory cells from one of the columns.

20. The vehicle of claim 18, wherein the electronic processor is further configured to determine the plurality of fingerprints such that each of the plurality of fingerprints includes one of the memory cells from at least two of the columns.

21. The vehicle of claim 18, wherein the electronic processor is further configured to determine the plurality of fingerprints such that each of the plurality of memory cells are included in at least one of the plurality of fingerprints.

* * * * *